April 30, 1968   V. K. PELTOLA ET AL   3,381,212
VOLTAGE REGULATOR WITH PROPORTIONAL CONTROL
Filed Nov. 15, 1965   2 Sheets-Sheet 1

INVENTORS
Alfred A. Obermaier
Veikko K. Peltola
BY Silverman & Cass
ATTORNEYS

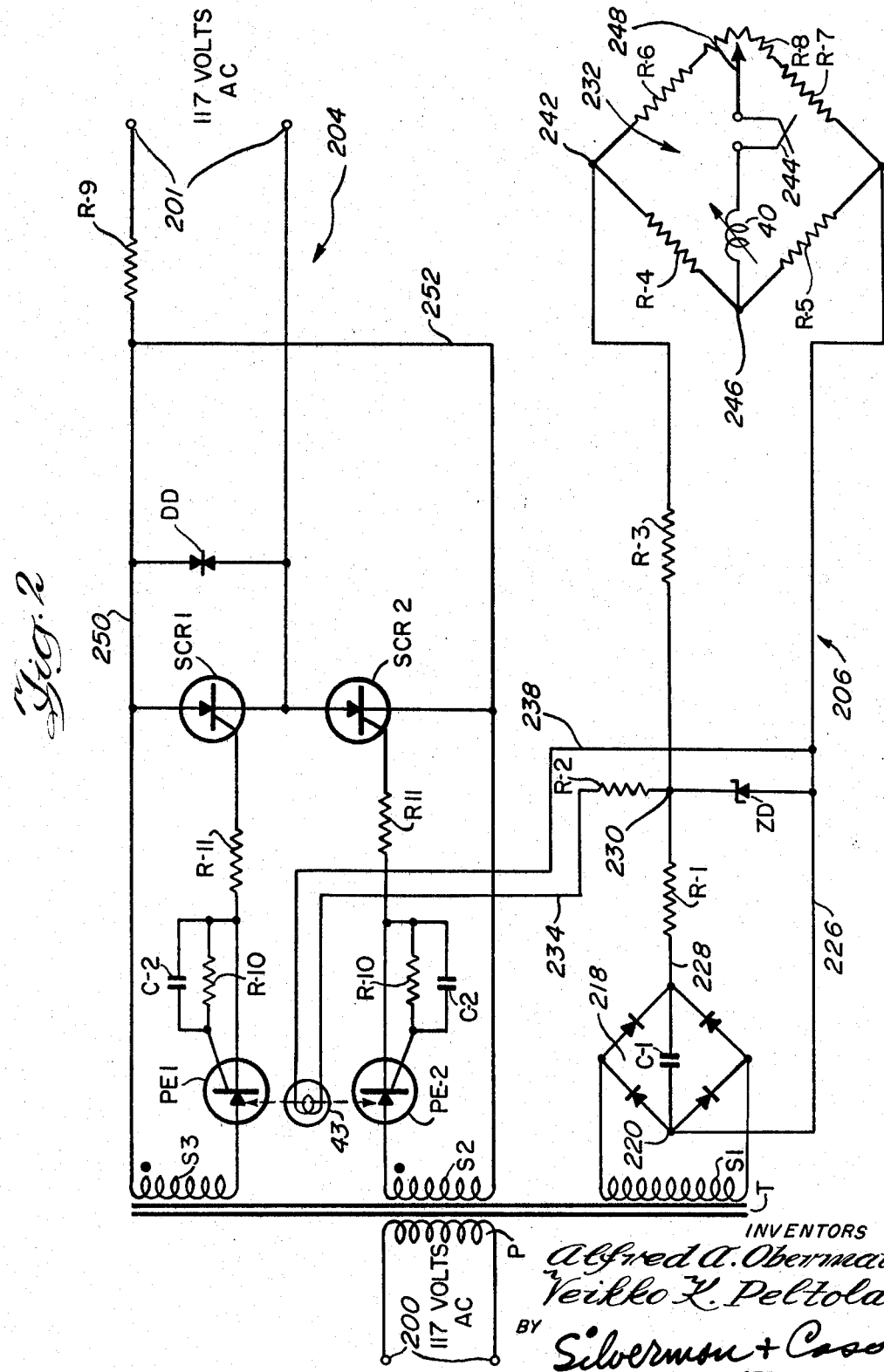

United States Patent Office 3,381,212
Patented Apr. 30, 1968

3,381,212
VOLTAGE REGULATOR WITH
PROPORTIONAL CONTROL
Veikko K. Peltola, Chicago, and Alfred A. Obermaier, Barrington, Ill., assignors to Alnor Instrument Company, Division, Illinois Testing Laboratories, Inc., Chicago, Ill., a corporation of Illinois
Filed Nov. 15, 1965, Ser. No. 507,967
15 Claims. (Cl. 323—21)

ABSTRACT OF THE DISCLOSURE

A control circuit having a transducer which responds to its environment and causes a physical reaction in an electro-mechanical device, which in turn variably affects the illumination impinging upon a photo-responsive element. The output from the photo-responsive element fires a trigger element, which enables an electronic valve means for a period of time proportional to the response of the transducer. The valve means thereby controls the amount of power delivered to a power absorbing load.

This invention relates generally to control circuits and more particularly is concerned with a so-called proportioning type of circuit in which a small change in a current or voltage is converted into a proportionally larger change.

The invention is described hereinafter in connection with its use in a control circuit for electric furnaces, in which a thermocouple or other transducer provides a current change due to a change of temperature, and this is converted into a change in the current flowing in a resistance element which supplies the power for the furnace. The invention has wide application beyond this specific use.

In co-pending application Ser. No. 507,968 filed by the applicants herein on Nov. 15, 1965, a galvanometer is described in which there is a light source in a part of the core directing a beam of light across a gap of the galvanometer magnetic circuit. In this magnetic circuit, recessed in a pole piece is a photo-responsive device, such as a photo-resistive cell aligned with the beam to receive the light from said beam. When the coil swings in response to an energizing current applied to the galvanometer, it will intercept the beam by moving through the gap, or it may have been in the gap in an intercepting position, and will move out of the beam. Such an effect is used to produce the conversion from a small current change to a large current change by means of a suitable circuit.

An object of this invention is to provide such a circuit.

Another arrangement is to provide a pair of photo-responsive devices, one in each pole piece on opposite sides of a core member, and separated from the core member by respective gaps, the coil of the galvanometer adapted to move through these gaps. A single light source is disposed in the core member and has a clear through passageway so that it emits a beam in opposite directions across both gaps, the beam being aligned with both photo-responsive devices so that two separate parts of a circuit or system may be controlled by the movement of the coil.

Another object of the invention is to provide a circuit utilizing an arrangement of this kind.

In the case of a proportioning control circuit of this kind, where the power to be controlled is alternating current, the use of two photo-responsive devices operated by the control means, such as the galvanometer, enables both half cycles of each cycle to be used for power and hence produces an efficient and economical system. The provision of this arrangement is another object of the invention.

Many other objects and advantages of the invention will appear to those skilled in this art from a description of preferred embodiments thereof set out below, in connection with which the drawings are used in order to illustrate and explain the same.

In the said drawings:

FIG. 2 is a circuit diagram of a proportioning control circuit according to the invention using a pair of photo-responsive devices.

As generally mentioned hereinabove, a control structure such as a galvanometer, is used to achieve a change in the light which impinges against a photo-responsive device. This photo-responsive device is connected into a circuit which in turn controls the operation of a silicon controlled rectifier. The circuit containing the photo-responsive device determines the part of each half cycle during which the SCR will pass current. Two circuits are illustrated and described, one in which a single photo-responsive device is used, and one in which a pair is used. The structure of the latter has a greater current capacity, for reasons which will be mentioned and can be quite economical.

Figure 1:
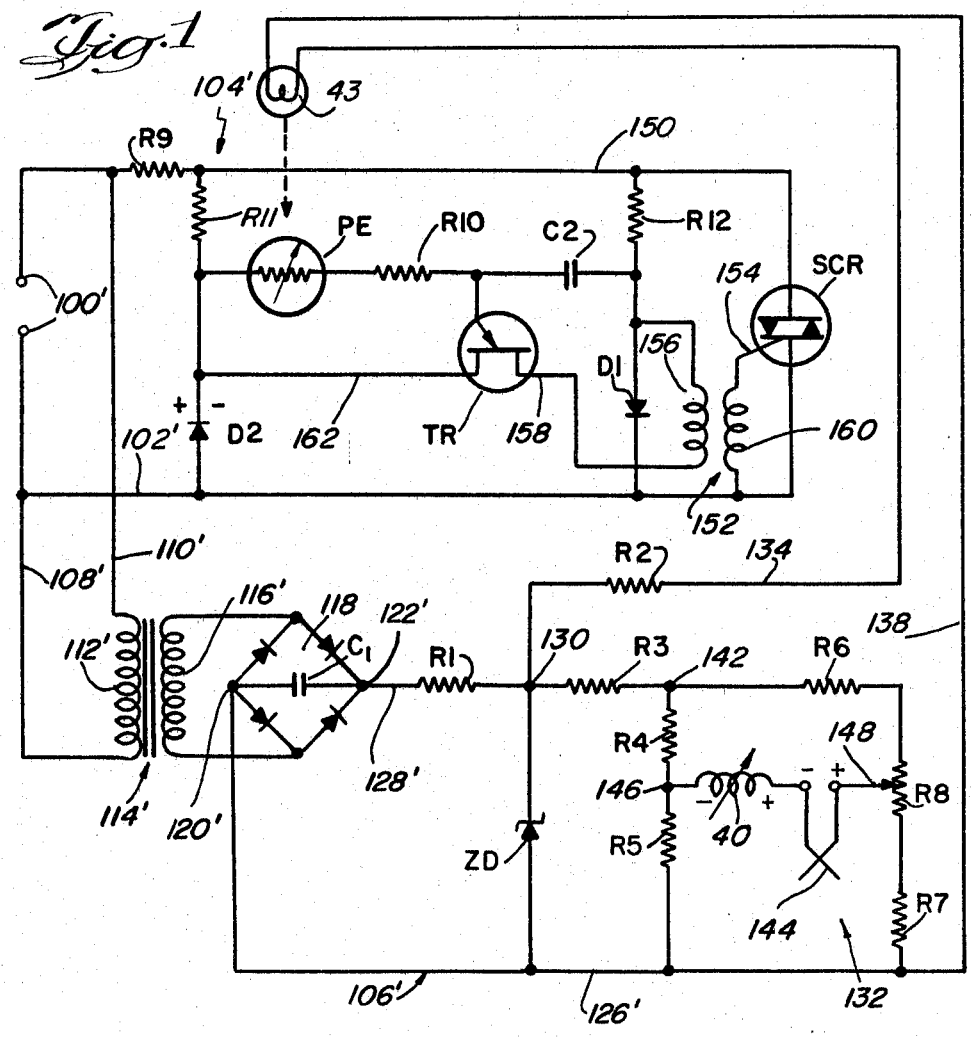
FIG. 1 is a circuit diagram of a proportioning control circuit according to the invention using a single photo-responsive device.

In FIG. 1 there is illustrated the circuit diagram of a structure utilizing the invention for controlling the heater resistance in some furnace or other resistive heater element. The apparatus is energized from a conventional A.C. line of approximately 117 volts, as indicated at the left, connected to the terminals 100'. The lower conductor 102' is a common line for the upper circuit 104'. This is the control circuit. The lower circuit 106' is the lamp circuit, as will be explained.

Terminals 100' connect by way of the lines 108' and 110' to the primary winding 112' of the transformer 114', the secondary winding 116' of which is connected across the terminals of a full wave rectifier 118'. The opposite terminals 120' and 122' of the rectifier have a filter condenser C1 connected across the same, and these terminals are respectively connected to the lines 126' and 128'. R1 in the line 128' is a voltage dropping resistor in order to adjust the voltage across the Zener diode ZD which is connected from the line 126' to the terminal 130. The galvanometer bridge 132 and the lamp 43 are both connected from the terminal 130 to the line 126' so that the Zener diode ZD controls the voltage of both. The lamp 43 has one line 134 with a series dropping resistor R2 connected to the terminal 130, and another line 138 connected to the line 126'. The bridge 132 has a dropping resistor R3 between its power terminal 142 and the terminal 130. The other power terminal of the bridge comprises the line 126'.

The galvanometer bridge 132 has the galvanometer coil 40 and a thermocouple 144 connected in series from the terminal 146 to the slider 148. The bridge arms consist of resistors R4, R5, R6, R7 and a potentiometer, the resistance element of which is designated R8. R5 is a temperature compensating resistor which corrects for ambient temperature changes in the vicinity of the thermocouple cold junction. Movement of the slider 148 with respect to the resistance element R8 enables the temperature set point to be varied.

It will be appreciated that the galvanometer coil 40 is in the center of the bridge 132 and that when the bridge is balanced by adjustment of the balance arms, there is a condition at which there will be no current flowing in the galvanometer coil. The thermocouple 144 reacts to a temperature change, and hence the condition represents a certain temperature of the environment within which the thermocouple is positioned, as for example, an electric furnace. Other control transducers could be used to signal a change from a desired condition, for operating some electrical apparatus when the change occurs. For example, current change in an element such as at 144 in place of the thermocouple could be achieved by change of speed, change of fluid flow, change of voltage, change of current, etc.

The upper portion of the circuit of FIG. 1 is the control circuit 104'. It is energized by means of an A.C. line as shown at 100' and it will also be seen that the controlled circuit is simply the resistor R9 in series with the silicon controlled rectifier SCR. Power applied to the resistor R9 is valved by the SCR, which in turn is controlled to permit only certain predetermined portions of the alternating current cycles passing through it. R9 could, for example, be the power supply element for an electric furnace whose temperature is being measured by the thermocouple 144.

The resistor R9 is connected by the line 150 through the silicon controlled rectifier SCR to the common line 102' so that the amount of current flowing through the resistor R9 will primarily be controlled by the amount which is permitted to pass through the SCR, as mentioned above. The SCR is gated by pulses which are applied through the pulse transformer 152 to the gating electrode 154 of the SCR. This latter may be of a double diode type known as a triac which passes current in both directions.

The primary winding 156 of the pulse transformer 152 will obtain pulses from a uni-junction transistor TR through a connection at one base 158 and will apply them to the gating electrode 154 by means of the secondary winding 160.

The firing point of the uni-junction transistor TR is controlled by means of the bias in its emitter circuit. This includes the resistor R10 and the photo-responsive element PE1, although the resistor R10 provides a fixed limit on current. In this example, the photo-responsive element is a photo-resistive cell, the total resistance of which depends upon the illumination of the cell. It will be seen that the cell is connected to the line 150 through a current-limiting resistor R11 and is also connected to the second base of the junction transistor TR by the line 162. The resistor R12 is another limiting resistor, and it is in series with the diode D1 across the SCR. Line 162 connects through the diode D2 to the common line 102'. The condenser C2 is a condenser controlling the frequency of oscillation of the relaxation oscillator described. The diodes D1 and D2 furnish return paths for full wave operation.

Figure 3:
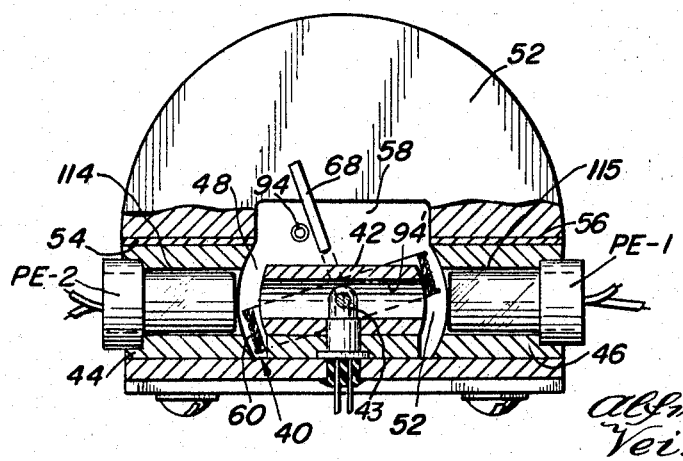
FIG. 3 is a diagrammatic sectional view through a d'Arsonval galvanometer to show a control structure for use with the invention.

In FIG. 3 there is illustrated a sectional view, more or less diagrammatic in nature, of a galvanometer which may be used with the circuit of FIG. 1 or FIG. 2, the latter yet to be described. The galvanometer is of the d'Arsonval type and may be a taut-band suspension type, if desired. Shown in the view is the permanent magnet 52 with a recess 58 adhered at 54 and 56 to the pole pieces 44 and 46 respectively. A core piece 42 having arcuate ends is mounted between the pole pieces 44 and 46 and is spaced respectively from the pole pieces to form the gaps 48 and 52' respectively. The galvanometer movement is not shown, but for a fragment 68 of a balancing rod and a stop member 94 cooperating therewith to limit swinging movement of the coil 40. The coil 40 is rectangular, as may be deduced from the sectional view of the same, and portions thereof such as shown at 60, are adapted to swing through the gaps 48 and 52 on opposite sides of the core piece 42.

The core piece 42 has a passageway 94' formed in the center thereof aligned horizontally in the view. A very small electric lamp 43 such as G.E. lamp #680 is mounted on the center of the passageway 94' so that a light beam is sent in opposite directions from the light source across the respective gaps 48 and 52, if permitted to do so. The movement of the coil 40 into the path of the beam will intercept the light and prevent its passing to opposite sides of the gaps, and assuming symmetry, this will occur on both ends of the passageway 94'.

Each of the pole pieces 44 and 46 is bored through to form sockets or passageways 114 and 115, and disposed in each of the passageways is a photo-responsive element, designated PE–1 on the right and PE–2 on the left. These elements may take the form of the photoswitch, a photo-resistive element, a photo-voltaic cell and the like. The principal effect desired is that there be an electrical change between the conditions that the coil intercepts the light impinging on the element, and the light is permitted to pass.

Continuing with the description of FIG. 1, it may be assumed for the purpose of this discussion that there is only one photo-responsive element PE–1, and that it is a photo-resistive cell, such as for example, a type CL604L photo-conductive cell made by Clairex Corp. of New York, N.Y. The null position of the coil 40 could be with the coil horizontal, as viewed in FIG. 3 thereby blocking transmission of any light from the lamp 43 to the photo-sensitive element PE–1. At this point, since the coil 40 is in its "zero" position, the galvanometer would be carrying no current.

As soon as current is allowed to flow through the galvanometer, the coil 40 deflects from the null position and a small amount of light is allowed to pass to the photo-resistive cell PE–1 causing its resistance to decrease. When the coil side moves far enough to completely uncover the passageway 115, the resistance of the photo-responsive element PE–1 is at a minimum. Control over the amount of light permitted to impinge against the photo-responsive element may be exerted through the use of a mask (not shown) over the end of the photocell. The opening of the mask may be experimentally determined to give the desired resistance characteristic for movement of the coil 40.

Current will pass through the SCR only at the portion of the A.C. cycle at which the uni-junction transistor TR fires. This, in turn, depends upon the resistance of the photo-responsive element PE–1.

The circuit of FIG. 1 is a trigger circuit in which there may be several pulses from the relation oscillator formed with the uni-junction transistor TR for each half cycle of the A.C. power. This is not required, since a single pulse per half cycle could be used. For example, with a simple trigger circuit, one pulse per alternate half cycle would be produced. In such a circuit, a bilateral controlled rectifier such as the triac shown would be useless, unless one used circuitry to render the trigger circuit responsive to both half cycles. A uni-lateral silicon controlled rectifier, at least at the present state of the art, could handle more power than those bilateral devices such as indicated at SCR. Further, uni-lateral silicon controlled rectifiers are more economical than bilateral ones.

The structure of FIG. 2 is ideally suited for use with an arrangement which utilizes two simple trigger circuits with two unilateral silicon controlled rectifiers, each handling an alternate half cycle, and the entire apparatus having substantial power capacity. In FIG. 2 there are two parts to the circuit shown, the lower part 206 being not much different from the lamp circuit portion 106' of FIG. 1, and the upper part 204 being the control circuit. In the lamp circuit 206, the elements are substantially the same as in FIG. 1, but with the reference numerals designated as a "200" series instead of a "100" series. The resistors have the same reference characters. Also, the operation is the same. The coil 40 is moved when current flows through it, and the movement will either move the coil out of the beams of the lamp 43 or intercept such beams.

The upper and lower circuits are both energized by a 117 volt A.C. line as shown at 200. This line energizes the primary winding P of the transformer T whose secondaries S1, S2 and S3 are isolated from one another. S1 energizes the lamp circuit 206, and S2 and S3 energize the two trigger circuits of the control circuit 204.

One trigger circuit has a photo-responsive element PE-1 in the form of a light-actuated bi-stable switch which can be gated by means of light. Such a device is known, for example, as a diffused silicon PNPN photocell, and the structure used could be type 3P15, manufactured by Solid State Products, Inc. of Salem, Massachusetts. The switch PE-1 is in series with the resistor R-11 and the gate electrode of a high power silicon controlled rectifier SCR1. Again the controlled element is the resistor R9 connected across the 117 volt line 201 through the rectifier SCR1 by way of the line 250. The portion of the half cycle which can be passed by SCR1 during which the SCR1 will conduct is determined by the point on that cycle at which the switch PE-1 operates. This in turn is controlled by proper choice of the resistor R10 which provides the bias for the gate of the switch PE-1. The capacitor C-2 provides a time delay to prevent too quick a recovery of the switch PE-1. Resistor R11 limits the current applied to the gating electrode of SCR1.

The identical trigger circuit is provided for the photo-responsive element PE-2 which controls the silicon controlled rectifier SCR-2 that is connected in series with the resistor R-9 through the line 252. Obviously, the silicon controlled rectifiers SCR-1 and SCR-2 will operate only on alternate half cycles, but current passing through both of them will pass through the resistor R-9. In this manner large amounts of power can be handled efficiently, since the silicon controlled rectifiers can be made with high current carrying capacity. For example, in one circuit, G.E. type C30C silicon controlled rectifiers were used, each having a current carrying capacity of 25 ampers.

The double diode DD is a line surge protector for the SCR's.

In the practical circuit constructed, the secondary windings S2 and S3 each had 5 volts across it, and obviously the switches PE-1 and PE-2 were in perfect synchronism with the SCR's so that the exact part of the cycle to be triggered could be pre-determined. The instantaneous open circuit voltage polarities of the terminals of the secondary windings S2 and S3 to which the anodes of the respective photo-switches PE-1 and PE-2 are opposite one another. Thus, the firing of the switches is on alternate half-cycles, and the connections with the SCR's are such that the half-cycles are synchronized with those half-cycles during which the respective SCR's can conduct current.

Although shown symmetrical, the circuit 204 could be asymmetrical, as for example by using two different kinds of photo-responsive elements, each responding with different characteristics. This could be adjusted in accordance with the amount of light passed, as for example by masks over the elements PE-1 and PE-2 or by the use of different kinds of circuits.

It should be understood that wide variations can be made in the circuits without departing from the spirit or scope of the invention as defined in the appended claims.

What it is desired to secure by Letters Patent of the United States is:

1. A converter for use in controlling an electrical circuit in response to a change in electric current in a transducer element, the invention herein which comprises:
    (a) a control circuit,
    (b) a power absorbing circuit including means for connecting same to an electric power source and said control circuit,
    (c) an electronic valve in said power absorbing circuit, and said valve having gating means,
    (d) said control circuit being coupled to said gating means and including a trigger device adapted to be fired to gate the valve,
    (e) a photo-responsive element in circuit with said trigger device for causing firing of said trigger device in response to a particular condition of illuminating of said photo-responsive element,
    (f) means illuminating said photo-responsive element,
    (g) a current-energized electro-mechanical device for selectively blocking said illumination,
    (h) a transducer circuit having a transducer element, the transducer circuit being connected with said electro-mechanical device so that changes in the current of said transducer element will operate said electro-mechanical device, and
    (i) a source of D.C. power for energizing said illuminating means, said illuminating means being positioned within said electro-mechanical device.

2. A converter for use in controlling an electrical circuit in response to a change in electric current in a transducer element, the invention herein which comprises:
    (a) a control circuit,
    (b) a power absorbing circuit including means for connecting same to an electric power source and said control circuit,
    (c) an electronic valve in said power absorbing circuit, and said valve having gating means,
    (d) said control circuit being coupled to said gating means and including a trigger device adapted to be fired to gate the valve,
    (e) a photo-responsive element in circuit with said trigger device for causing firing of said trigger device in response to a particular condition of illuminating of said photo-responsive element,
    (f) means illuminating said photo-responsive element,
    (g) a current-energized electro-mechanical device for selectively blocking said illumination,
    (h) a transducer circuit having a transducer element, the transducer circuit being connected with said electro-mechanical device so that changes in the current of said transducer element will operate said electro-mechanical device, and
    (i) said transducer circuit having a normally balanced bridge circuit with said electro-mechanical device and transducer element connected across terminals thereof which have no potential across said terminals during balanced condition, but which will have a difference in potential across said terminals upon change of current in said transducer whereby to cause a proportional change in the current of the electro-mechanical device.

3. The structure of claim 2 in which said photo-responsive element is photo-resistive and the trigger device has a bias network which includes said photo-responsive element.

4. The structure of claim 2 in which the valve is a silicon controlled rectifier and the power source is alternating current.

5. A converter for use in controlling an electrical circuit in response to a change in electric current in a transducer element, the invention herein which comprises:

(a) a control circuit,
(b) a power absorbing circuit including means for connecting same to an electric power source and said control circuit,
(c) an electronic valve in said power absorbing circuit, and said valve having gating means,
(d) said control circuit being coupled to said gating means and including a trigger device adapted to be fired to gate the valve,
(e) a photo-responsive element in circuit with said trigger device for causing firing of said trigger device in response to a particular condition of illuminating of said photo-responsive element,
(f) means illuminating said photo-responsive element,
(g) a current-energized electro-mechanical device for selectively blocking said illumination,
(h) a transducer circuit having a transducer element, the transducer circuit being connected with said electro-mechanical device so that changes in the current of said transducer element will operate said electro-mechanical device, and
(i) said power source being alternating current, said valve being a silicon controlled rectifier which is bi-lateral in operation and the control circuit has reverse current paths to permit operation of said trigger device on both positive and negative half cycles of alternating current power.

6. The structure of claim 2 in which the trigger device is connected in a relaxation oscillator and means are provided to couple pulses from said oscillator to said gating means, including a pulse transformer.

7. The structure of claim 1 in which the photo-responsive element is a light-actuated switch.

8. A converter for controlling electric current in a power absorbing element connected in a controller circuit with a first source of alternating current by means of a substantially smaller current change in a transducer element, which comprises:
(a) a control circuit having two parts, each part comprising
    (1) a photo-responsive electric switch
    (2) a uni-lateral electronic valve having a gating electrode,
    (3) said photo-responsive switch being connected with the gating electrode and having means for adjusting the extent of illumination causing operation of the switch,
    (4) a second source of A.C. driving said photo-responsive switch and having means for connecting said second source to the first source to synchronize the frequency of the controlled circuit with that of said second source,
(b) there being two of said second sources, each arranged to drive one of said photo-responsive switches,
(c) a controlled circuit comprising a power absorbing element, and means connecting each of said electronic valves to said power absorbing element in a full-wave rectifying connecting so that each valve is capable of passing current through said power absorbing element on respective alternate half cycles of the frequency of said first source,
(d) means for connecting the controlled circuit to said first source,
(e) the second sources being connected to their respective photo-responsive switches with oppositely poled instantaneous voltage so that the switches are operated on alternate half cycles of said frequency and being connected so that the half cycle of operation of one switch is the same half cycle during which the valve connected therewith is capable of passing current,
(f) a source of illumination directing light beams to impinge against each photo-responsive switch,
(g) an electric current energized electro-mechanical device having a moving member for selectively blocking or unblocking the light beams, and
(h) a circuit having a transducer element and said electro-mechanical device connected together therein so that electric current produced in said transducer as a result of some physical change of said transducer will affect said electro-mechanical device to cause movement of said moving member.

9. A converter as claimed in claim 8 in which the second sources comprise the secondaries of a transformer, the primary of which has terminals adapted for connection to said first source.

10. A converter as claimed in claim 8 in which said last-mentioned circuit includes a bridge with the transducer element and electro-mechanical device connected in series across the balance terminals of said bridge, a source of D.C. power connected across the power terminals of the bridge, the balance arms being adjusted so that there is zero current flowing through the electro-mechanical device for a given condition of current flow of said transducer element, whereby change in the current of the transducer element will cause current to flow in the electro-mechanical device.

11. A converter as claimed in claim 10 in which means are provided in the balance arms to change the condition of current flow of said transducer element from that for which there is zero current flow in said electro-mechanical device.

12. A converter as claimed in claim 11 in which the transducer element is a thermocouple and the electro-mechanical device is a d'Arsonval galvanometer having a moving coil, said moving member comprising said moving coil.

13. A converter as claimed in claim 10 in which said source of illumination is a D.C. energized lamp connected with said source of D.C. power and having means for regulating the voltage across said lamp while at the same time regulating the voltage across the power terminals of said bridge.

14. A converter adapted to be operated by a transducer element for proportionally increasing a change of current in the transducer element to a substantially larger change of current in a power absorbing element which comprises:
(a) a pair of silicon controlled rectifiers each having a gating electrode and the anode of one connected to the cathode of the other and forming a central junction.
(b) a power absorbing element having one terminal adapted to be connected to one side of an A.C. line, and the other terminal connected to the cathode of the one rectifier and the anode of the other, the said junction adapted to be connected to the other side of the A.C. line,
(c) a pair of light-activated switch circuits, each light-activated switch circuit connected across the gating electrode and cathode of the respective rectifiers.
(d) means for energizing each switch circuit from said A.C. line but the circuits being energized on alternate half cycles in synchronism with the respective half-cycles during which the respective connected rectifier is capable of passing current,
(e) a source of light having light beams directed to said switch circuits to cause switching operation of the circuits but only when said light beams are not blocked,
(f) a transducer element,
(g) a moving member adapted to be moved between positions blocking said beams and unblocking said beams,
(h) the transducer element being connected to the moving member and having no effect upon the moving member when a given current flows in the transducer element as a result of physical conditions to which the transducer element is subjected, but causing movement of the moving member when the current in the transducer element changes as a result of a change in said physical conditions.

15. A converter as claimed in claim 14 in which the moving member is the coil of a d'Arsonval galvanometer and the transducer element is a thermocouple connected in series with the coil, and both are connected in a bridge circuit which is balanced when said given current flows, but becomes unbalanced when the current changes thereby causing current to flow in the coil, and the coil to move from a blocking to an unblocking position relative to the beams of light.

References Cited

UNITED STATES PATENTS

| | | | |
|---|---|---|---|
| 2,761,052 | 8/1956 | Knudsen | 219—502 |
| 3,116,396 | 12/1963 | Knudsen | 219—502 |
| 3,274,375 | 9/1966 | Beltz | 219—502 X |

JOHN F. COUCH, *Primary Examiner.*

W. E. RAY, *Examiner.*